United States Patent [19]

Koenig

[11] Patent Number: 4,607,202
[45] Date of Patent: Aug. 19, 1986

[54] APPARATUS FOR AUTOMATICALLY ELIMINATING CONTROL FORCE ERRORS IN AIRCRAFT, ESPECIALLY HELICOPTERS

[75] Inventor: Herbert Koenig, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 769,874

[22] Filed: Aug. 27, 1985

[30] Foreign Application Priority Data

Aug. 28, 1984 [DE] Fed. Rep. of Germany ....... 3431583

[51] Int. Cl.$^4$ .............................................. G05B 11/01
[52] U.S. Cl. .................................... 318/628; 318/584; 318/586; 318/646; 244/223
[58] Field of Search ............... 318/628, 626, 584, 586, 318/646; 244/223

[56] References Cited

U.S. PATENT DOCUMENTS

| | | | |
|---|---|---|---|
| 3,476,335 | 11/1969 | Andeen et al. | 318/628 X |
| 3,700,995 | 10/1972 | Parkinson et al. | 318/628 |
| 4,106,728 | 8/1978 | Griffith | 244/223 |
| 4,228,386 | 10/1980 | Griffith | 318/628 |
| 4,345,195 | 8/1982 | Griffith et al. | 318/628 |

Primary Examiner—B. Dobeck
Attorney, Agent, or Firm—W. G. Fasse; D. H. Kane, Jr.

[57] ABSTRACT

Control force errors are automatically eliminated in aircraft, especially helicopters. Such errors may occur because of disturbing forces that act on a control stick (1) for the elevator and/or rotor blade adjustment. The following features are combined. A main control drive (3) for the adjusting of the elevators and/or rotor blades is connected through a control linkage (2) with the control stick (1). A spring box (5) with a pretensioned spring (17) is connected through a control rod (14) to the control stick (2) and to one end of the spring box (5). A trimming rod (15) of a trimming motor (4) is operatively connected to the other end of the spring box (5). To compensate the disturbing forces caused by the inertial mass forces acting upon the control stick (1) as much as possible there are further provided two displacement pickups (6) and (7) or a single displacement difference forming pickup (16). A first summing circuit (8) receives the output signals from the two pickups (6, 7). A control force pickup (10) measures the pilot's hand force ($P_H$). A signal limiter 12, an amplifier (11), as well as further summing circuits (9) and (13) are used to produce a compensating or correcting feedback signal supplied to a control input of the trimming motor in a closed loop control circuit.

8 Claims, 7 Drawing Figures

APPARATUS FOR AUTOMATICALLY ELIMINATING CONTROL FORCE ERRORS IN AIRCRAFT, ESPECIALLY HELICOPTERS

FIELD OF THE INVENTION

The invention relates to an apparatus for automatically eliminating control force errors arising in aircraft, especially helicopters, from disturbing forces acting upon the control stick used by the pilot for adjusting the elevators and/or rotor blades.

DESCRIPTION OF THE PRIOR ART

Devices of this type comprise a control linkage articulated to the control stick for connecting the control stick to a main control drive. A control rod is connected with one end to the control stick approximately opposite to the control linkage connection on the control stick. The other end of the control rod is operatively connected to a spring box enclosing a pre-tensioned or pre-stressed spring. The spring box is also connected to a trimming motor that is operatively connected to the other side of the spring box by means of a trimming rod. The purpose of the trimming motor is to relieve the control stick of any undesired forces that could otherwise be transmitted to the pilot. More specifically, the trimming motor provided in this typical construction serves to free the control stick from forces after the input of control movements and after the establishment of a new flight status. The pilot achieves this purpose by means of a trimming switch connected to the control stick. This trimming switch is used by the pilot to give suitable control instructions to the trimming motor, whereupon the trimming motor operates a reciprocable trimming rod for altering the tension of a spring in a spring box to such an extent that the control movements of the control stick are compensated and it is again free of forces. However, unwanted disturbing forces caused by accelerations can act upon the control stick at any time. In such case, the unbalanced inertial masses unavoidably present in the control linkage, lead to disturbing moments and forces acting on the control stick. The control stick itself is also subject to these inertial or mass forces. The direction in which the resulting moment acts upon the control stick depends upon the distribution of mass in the control stick itself as well as the inertial forces of the other masses acting on the control stick and finally upon the location of the pivot bearing point of the control stick. Such disturbing forces and moments also arise when the pilot makes a conscious control movement as in, for example, an upwardly directed banking turn. Because the arising disturbing forces cannot be estimated beforehand, these forces can disconcert or irritate the pilot and prevent him from satisfactorily controlling the craft.

OBJECTS OF THE INVENTION

In view of the above it is the aim of the invention to achieve the following objects singly or in combination:

to provide a device or apparatus of the type described above, for substantially compensating disturbing forces and moments resulting from inertial forces and acting on the control stick, especially of an aircraft;

to derive a compensating control signal for a control stick trimming motor from a plurality of forces and/or moments that may become effective on the control stick;

to provide an apparatus for the just stated purpose, which apparatus is exceptionally simple because it requires a small number of components; and to provide an arrangement which will enable a pilot to modify, in accordance with his individual preference, the spring constant of a spring in a spring box which determines the control "feel" of the control stick, in a quasi electronic manner.

SUMMARY OF THE INVENTION

This aim is achieved according to the invention by the following features: Displacement sensing means measure the displacement to which the above mentioned spring is exposed, to provide a respective spring displacement representing signal. This signal is then processed with a signal representing the force manually applied by the pilot to the control stick. In a preferred embodiment, the spring displacement sensing means comprise a first displacement pickup for measuring the control displacement of the control stick; a second displacement pickup for measuring the displacement of the trimming rod of the trimming motor; a first summing element for subtracting the output signal of the second displacement pickup from the output signal of the first displacement pickup; a control force pickup for measuring the force of the pilot's hand on the control stick; a signal limiter for receiving the output signal from the control force pickup; a second summing element for subtracting the output signal of the signal limiter from the output signal of the control force pickup; an amplifier for receiving this summation signal; as well as a third summing element for subtracting the summation signal of the first summing element from the output signal of the amplifier, to produce the trimming motor control signal.

As will become still clearer from the following detailed description of an example embodiment, the device according to the invention is capable of almost completely compensating the inertial forces acting upon the control stick. The flight safety is thereby substantially increased. Furthermore, the device is distinguished by its great conceptual simplicity combined with the smallest possible mechanical and circuit technology expenditures. The device has the further advantage that it is possible, by the proper selection of the adjustable amplification factor of the amplifier which is preferably an operational amplifier, to match or adapt the spring force felt by the pilot, and caused by the spring contained in the spring box to the pilot's individual wishes or preferences by means of a quasi electronic change in the spring constant, as will also be described in more detail below.

BRIEF DESCRIPTION OF THE DRAWINGS

In order that the invention may be clearly understood, it will now be described, by way of example, with reference to the accompanying drawings, wherein:

FIG. 2 shows one example of the principle of a spring box utilized in the device of FIGS. 1 and 1a;

DETAILED DESCRIPTION OF PREFERRED EXAMPLE EMBODIMENTS AND OF THE BEST MODE OF THE INVENTION

Figure 1:
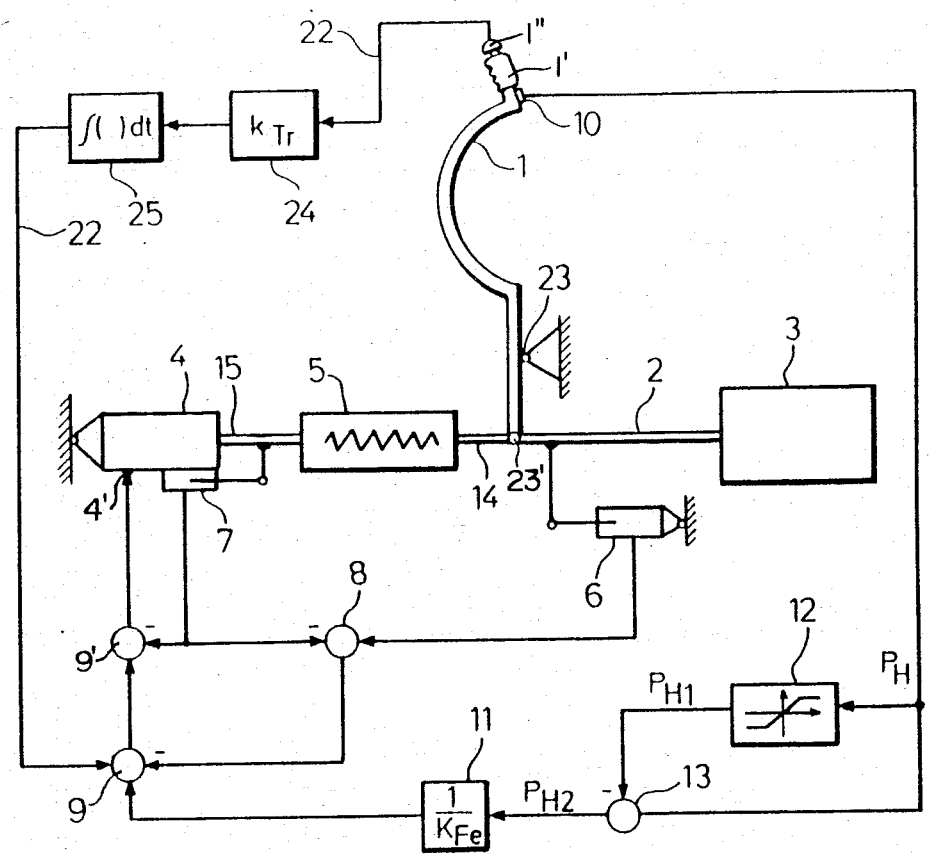
FIG. 1 shows a block circuit diagram of a device or apparatus according to the invention for producing a trimming motor control signal.
Figure 2:
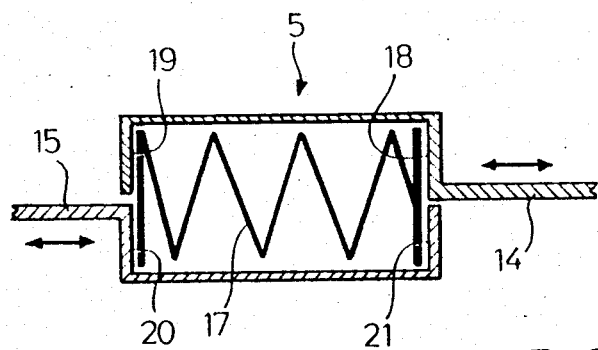

FIG. 1 schematically shows a control stick 1, for example of a helicopter, a control linkage 2 for the rotor blade adjustment or for an elevator adjustment articulated to the control stick 1 on its right side, and a control rod 14 operatively connected to the control stick 1 approximately opposite to the control linkage 2 which connects the control stick 1 to the main control drive 3. The control drive 3 operates the blade angle adjustment means or an elevator, not shown, in a conventional manner. The control rod 14 is operatively connected to a spring box 5 the construction principle of which is shown in FIG. 2. Furthermore, a trimming motor 4 is shown having a trimming rod 15 which can be reciprocated by the motor 4 so that the rod 15 can move into and out of the spring box 5. The rod 15 operatively connects the trimming motor 4 to the other side of the spring box 5. Displacement pickups 6 and 7 measure the control or adjustment displacements of the control linkage 2 and of the trimming rod 15 respectively for producing respective first and second displacement representing output signals supplied to a first summing element 8 in which the output signal of the displacement pickup 7 is subtracted from that of the displacement pickup 6 to provide a first difference signal which is used to provide the trimming motor control signal.

A control force pickup 10 is operatively connected to the control stick 1 for measuring the control force applied by the pilot to the handle 1' of the control stick 1. Load cells or strain gages such as foil strain gages can be used as the control force pickup 10. A load cell is distinguished from other sensors by its substantially lower sensitivity to disturbances caused by incident electromagnetic fields. Strain gages, however, must be provided with the proper shielding against such electromagnetic field disturbances. The output signal $P_H$ of the control force pickup 10 is supplied to a signal limiter 12 for clipping this signal above a specifiable, adjustable limiting or threshold value. The output signal $P_{H1}$ of this signal limiter 12 is subtracted from the output signal $P_H$ of the control force pickup 10 by a second summing element or circuit 13 downstream of the signal limiter 12. The resulting summation or rather second difference signal $P_{H2}$ is supplied to an amplifier 11, such as an operational amplifier, having an amplification factor that can be constant or adjustable. The output signal of the amplifier 11 finally reaches a third summing element 9, where the summation or rather difference signal of the first summing element 8 is subtracted from it. The output signal of the amplifier 11 is supplied to a third summing element or circuit 9 which subtracts the first difference signal, namely, the output signal of the first summing element or circuit 8, form the output signal of the amplifier 11 representing the second difference signal, to provide the trimming motor control signal for the trimming motor 4. The third summing circuit also receives a signal from an integrator 25, but this signal is supplied only when the pilot operates a switch 1" as will be described in more detail below.

FIG. 1 further shows a separate trim control circuit 22, 24, 25 which is under the direct control of the pilot who can produce a trimming motor control signal by operating a button 1" as will be described in more detail below.

FIG. 1 shows a fourth summing circuit 9' which receives at one of its inputs the third difference signal as it appears at the output of the summing circuit 9, and at its other input the second output signal from the displacement pickup 7. This second output signal is thus supplied as a subtrahend to the first summing circuit 8 and to the fourth summing circuit 9'. The fourth summing circuit 9' provides a negative feedback signal element for the trimming motor control signal directly from the trimming rod displacement of the rod or member 15 as sensed by the pickup 7.

Figure 1A:
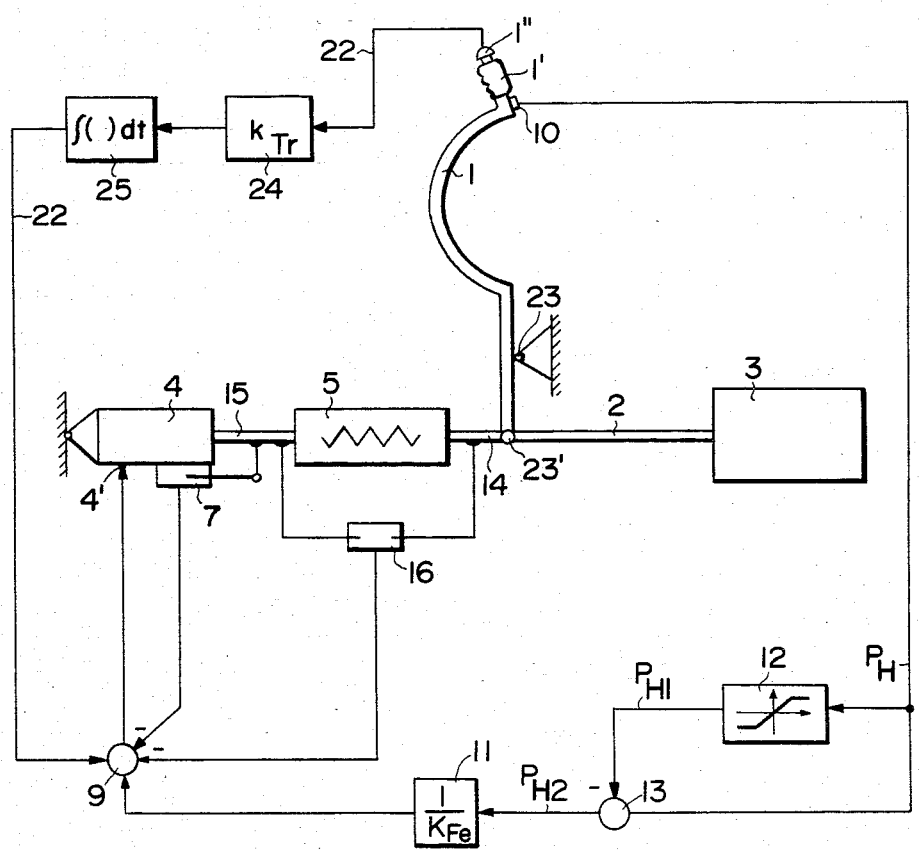
FIG. 1a is an embodiment similar to FIG. 1, but using a single differential displacement sensor.

FIG. 1a shows an embodiment of the invention similar to that of FIG. 1, however, in FIG. 1a a single differential displacement sensor 16 has replaced the displacement pickup 6, and the summing circuit 8. The single differential displacement pickup 16 directly measures the difference between the control displacement of the control rod 14 and the adjustment displacement of the trimming rod 15, whereby the resulting output signal from the pickup 16 is fed to the summing element or circuit 9. Otherwise, the operation of the arrangement of FIG. 1a is the same as that of FIG. 1, and therefore, the operation will be described only once.

FIG. 2 shows the manner of operation of the spring box 5. A spring 17, or a set of springs, is operatively enclosed between stop faces 18 and 19 that have a fixed space between them and are structurally fixed to the control rod 14. The spring 17 also lies between corresponding stop faces 20 and 21 of the trimming rod 15. The trimming rod 15 and the control rod 14 are axially slideable relative to each other, whereby the distances between the stop faces 18, 20 and 19, 21 can be changed. However, in the neutral position these distances or spacings are so dimensioned that the spring 17 is continuously under a minimal tension which determines the force that must be exerted by the pilot to overcome the spring biasing. This force is the minimum force that the pilot must exert to enable a control movement or displacement of the control stick 1 and such minimum force is then expressed in a corresponding compression of the spring 17. When the pilot intends to increase the flight speed he must push the control stick 1 forward. After he has exceeded said minimum force required to overcome the spring bias, the pilot moves the stick 1 and the control rod 14 is simultaneously moved to the right in FIGS. 1 and 2. The spring 17 is compressed because it is pushed along by stop face 19, but is held back by the stop face 21 of the trimming rod 15. After the aircraft arrives at a new stable flight attitude, the pilot can, in a typical manner, cause the trimming motor 4 to extend its trimming rod 15 so far to the right that the spring 17 is decompressed again to the fixed biasing tension, whereby the stop faces are brought back to the same position relative to each other as in the trimmed state before the initiation of the control movement, for example, as shown in FIG. 2. This action of the trimming motor 4 is caused by a trimming signal sent by the pilot over a lead 22 shown in FIGS. 1 and 1a. For this purpose the pilot operates the button 1" and the resulting signal is amplified in the amplifier 24 and integrated in the integrator 25 whereupon it is supplied to the control input 4' of the trimming motor 4, preferably through the third summing network 9. Incidentally, the summing circuits 8, 9, 13, and 9' are all conventional signal combining circuits available as shelf items.

The closed loop control circuit shown in FIG. 1 operates under normal conditions, that is, without the occurrence of a disturbance, as follows. In the first place, the displacement pickups 6 and 7 provide signals of equal magnitude to the summing circuit 8 where these signals are compensated to zero when the control stick 1 is in a trimmed state approximately corresponding to a zero position. If the pilot wants to cause an increase in horizontal speed from the trimmed state, he pushes the control stick 1 forward, as described above. The displacement pickup 6 now measures a control displacement change $d_F$ that is identical to the spring displacement of spring 17: $d_F = P_F/K_F$, where: $P_F$ is the spring force transmitted from the control rod 14 into the spring 17 and $K_F$ is the mechanical spring constant. Simultaneously, a hand force $P_H$ is measured by the control force pickup 10. The hand force $P_H$ is proportional to the spring force $P_F$ due to the leverage ratio a/b determined by the location of the pivot bearing point 23, thus: $P_F = (a/b) \cdot P_H$. Whereby "a" is the distance between 10 and 23 and "b" is the distance between 23 and 23'. An output signal corresponding to this hand force $P_H$ is transmitted by the control force pickup 10 to the amplifier 11 through the second summing circuit 13. The signal $P_H$ is multiplied by an amplification factor $k = 1/K_{Fe}$ so that a signal $P_H/K_{Fe}$ is transmitted to the summing element 9, whereby it is assumed that the signal limiter 12 is not effective. The purpose and function of the signal limiter 12 will be described below.

The output signal transmitted meanwhile by the displacement pickup 6 corresponds to the spring displacement $d_F = P_F/K_f$. This signal is transmitted unchanged through the summing circuit 8 to the summing circuit 9 because at this time the displacement pickup 7 does not detect any change in the regulating or adjusting displacement of the trimming rod 15. If the control force pickup 10 is calibrated respectively, the leverage proportionality factor a/b can be adjusted to be equal to one, so that the input signals for the summing circuit 9 in the case in question are equal to each other, if in the amplification factor k the denominator is chosen so that $K_{Fe} = K_f$; thus: $d_F = P_F/K_f$. Accordingly, no control signal is transmitted to the input 4' of the trimming motor 4 by the summing circuit 9. The pilot must start the trimming procedure himself as described above. For this purpose he pushes the button 1" so that a suitable trimming signal reaches the summing element 9 over a conductor 22 through said amplifier 24 and the serially connected integrator 25 to the trimming motor 4.

When a disturbance such as an acceleration now occurs, for example due to a wind squall coming in head on, then inertial mass forces of the linkage 2 act upon the lower end of the control stick 1. These are caused because the linkage 2 is not free of masses. The upper part of the control stick 1, above the pivot bearing point 23, is likewise subject to a forwardly acting inertial mass acceleration. If the torque moment exerted by said acceleration is smaller than that exerted by the above described forces, a resulting torque arises that seeks to move the lower end of the control stick 1 in FIG. 1 to the left.

The pilot can now react in two ways. First, he can theoretically yield to the handle of the control stick 1 which is pressing backward, to the right in FIG. 1, but this will hardly be the case in practice, because it would not maintain the flight safety. Second, he can prevent the movement by applying an opposing force with his hand, which is required to maintain the flight attitude.

In the first case, a compression of the spring 17 in the spring box 5 results after the above mentioned minimum force necessary to overcome the spring bias is exceeded, combined with a spring displacement $d_F = P_F/K_f$. Because of just such disturbances this minimum force should not be adjusted to be too small. The output signal of the displacement pickup 6 changes simultaneously by an amount corresponding to this spring displacement. However, the control force pickup 10 will not produce an output signal because no tensions or stresses are applied to the control stick 1. The displacement pickup 7 does not alter its signal at this time. Therefore, the full value of the change in the output signal of the displacement pickup 6 can pass through both summing circuits 8 and 9 and serve as a control signal for the trimming motor 4 which then causes a relaxation of the spring 17 corresponding to the control displacement $d_F$ so that the control stick 1 is again free of forces.

At this point, it is to be noted that the closed loop control is very quick compared to the disturbances arising because the entire helicopter, for example, naturally has a considerable total mass. Hence, the deceleration due to a wind gust commences only relatively slowly. Therefore, large spring displacements $d_F$ do not arise. Moreover, the correction by the trimming motor 4 follows very quickly.

In the second case, a hand force $P_H$ is applied at the location of the control force pickup 10. This hand force is exactly equal to the spring force $P_F$ that would be stored in the spring 17 by the disturbance in the above-mentioned first case. However, no spring compression is now caused at this time because the control stick 1 is held fast. Therefore, both displacement pickups 6 and 7 do not alter their output signals for the time being and the output signal of the control force pickup 10 can pass through the amplifier 11 and the summing element 9 to serve as a closed loop control signal for the trimming motor 4 which now causes a compression of the spring 17 to such an extent that the torque acting upon the control stick 1 is exactly counteracted and the hand force $P_H$ caused by the pilot is compensated. Here too the closed loop control works so quickly and sensitively that the pilot does not perceive any noticeable pressure.

In both cases described, the features according to the invention result in a decided improvement in the flight stability.

It is possible that intended controlling movements overlap or are superimposed on disturbances of the types described above. Even in such a case the superimposing of the control procedures described above will also result in the desired stabilizing effect.

Figure 3A:
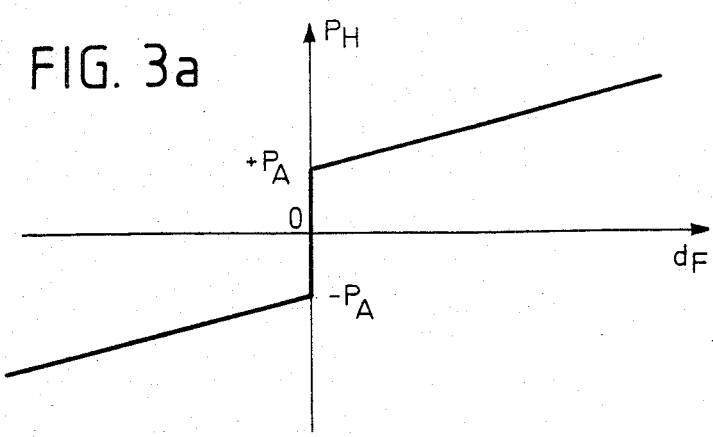
FIG. 3a shows the characteristic of the pilot's hand force as a function of the control displacement when there is no disturbing force or moment involved.

FIG. 3a shows the dependence of the pilot's hand force $P_H$ on the control displacement or spring displacement $d_F$ which arises when a control movement out of the trimmed state is commenced. This trimmed state quasi corresponds to a variable zero point. The minimum force $P_A$ required to overcome the spring bias is determined by the adjustable mechanical pre-tensioning of spring 17. After this minimum force $P_A$ is exceeded the control displacement $d_F$ is linearly dependent on the hand force $P_H$ and is fed into the spring 17 symmetrically in both directions because of the special construction principle of the spring and spring box as shown in FIG. 2.

Figure 3B:
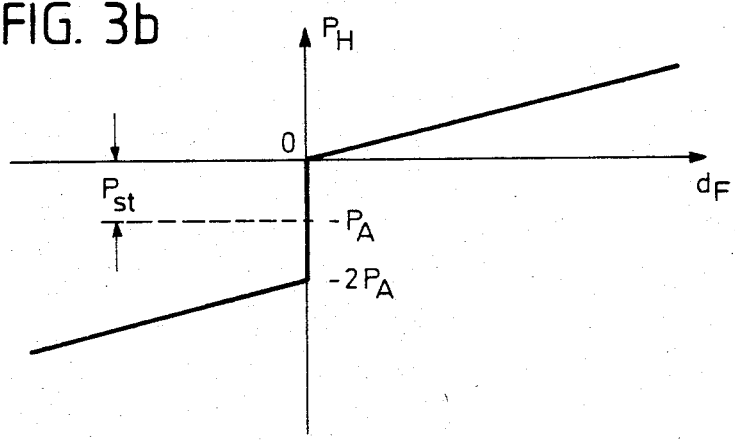
FIG. 3b shows the characteristic of the pilot's hand force as a function of the control displacement where there is a disturbing force or moment involved.

FIG. 3b shows how the characteristic of FIG. 3a changes when a disturbing force $P_{st}$, that is exactly equal to the minimum force $P_A$ required to overcome the spring bias, arises. The curve is shifted in the direction of the ordinate by the amount of this disturbing force $P_{st}=P_A$. This means that the pilot, in case he commences a control movement at that moment, will find that no force is required to overcome the spring bias in the one direction and a double force is required in the other direction. In the one direction, his control movement would immediately be translated into the corresponding spring displacement $d_F$ and in the other direction, a doubled force $2P_A$ to overcome the spring bias must first be exceeded.

Figure 4A:
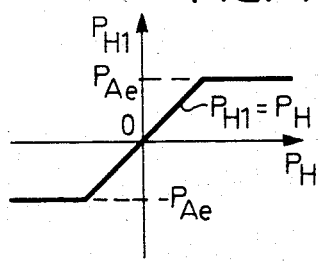
FIG. 4a shows the signal processed by the signal limiter.
Figure 4B:
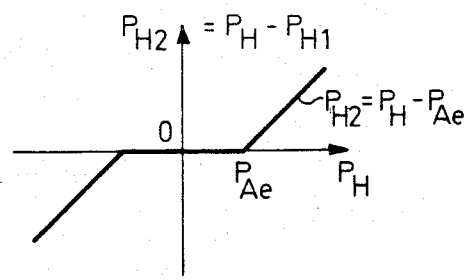
FIG. 4b shows the signal processed by the second signal summing circuit.

The signal limiter 12 shown in FIGS. 1 and 1a has the following function. It allows low signal values $P_H$ from the control force pick-up 10 to pass unchanged up to a threshold value $P_{Ae}$ that is maintained as a constant output value of the signal limiter 12 when the signal values $P_H$ rise further above the value $P_{Ae}$, see FIG. 4a. Finally, the output signal $P_{H2}$ at the output of the summing circuit 13 is associated with the signal $P_H$ in the manner shown in FIG. 4b. The limiting value $P_{Ae}$ can be chosen to be equal to the minimum mechanical force $P_A$ required to overcome the spring bias as determined by the pre-tensioning of the spring 17 or it can be adjusted to some other value.

It will next be explained how the closed loop control circuit with the signal limiter 12 operates in response to the commencement of a normal control movement by the pilot. Let it be assumed that the pilot is applying a forwardly directed pressure to the control stick 1 for increasing the flight speed as desired. As long as the minimum force $P_A$ required to overcome the spring bias determined by the mechanical pre-tensioning of the spring 17, is not exceeded, neither a control displacement nor a spring displacement $d_F$ will occur, and the output signal of the displacement pickup 6 remains unchanged. Although the control force pickup 10 measures a hand force $P_H < P_A$, the corresponding output signal cannot yet pass the summing circuit 13 because of the characteristics of the signal limiter 12, see FIG. 4. When the pilot's hand force $P_H$ reaches the threshold value $P_{Ae}$ of the signal limiter 12, it is assumed for the moment the threshold value is equal to the mechanical minimum force $P_A$ required to overcome the spring bias, a spring displacement $d_F$ and a corresponding output signal of the displacement pickup 6 occur on the one hand, while on the other hand, an equal signal representing the spring displacement $d_F$ occurs at the output of the summing circuit 13. Both signals compensate each other in the summing circuit 9 so that no control signal reaches the trimming motor 4. The pilot therefore finds a completely normal attitude and must trim the aircraft himself.

If the limiting value $P_{Ae}$ is adjusted to be smaller than said mechanical minimum force $P_A$, a signal appears at the output of the summing circuit 13 all ready before this minimum force is reached which causes a reaction of the trimming motor 4 in the sense of an apparent reduction of the minimum force $P_A$ felt by the pilot. A spring displacement $d_F$ occurs immediately even though the mechanical minimum force $P_A$ has not yet been attained. Therefore, the minimum force $P_A$ perceived by the pilot may be individually altered by adjusting the limiting value $P_{Ae}$.

If a small disturbing force that is still below the mechanical minimum force $P_A$ occurs when the control stick 1 is in a trimmed state then this has no immediate effect because the disturbing force is completely taken up by the pre-tensioned spring 17. However, no spring displacement or control displacement of the control rod 14 takes place in such a situation. Therefore, the control stick 1 remains at rest and output signals do not occur in the displacement pickup 6 nor the control force pickup 10. When the disturbing force exceeds the mechanical minimum force $P_A$, the pilot perceives a hand force $P_H$ as soon as he holds the control stick 1 tight, which would otherwise yield to the disturbing force. The output signal now generated by the control force pickup 10 is initially blocked by the summing element 13 and the displacement pickup 6 also does not alter its output signal. The pilot now has the feeling as though he himself is performing a sensing movement with the control stick 1 that is still below the minimum force $P_A$ which does not, however, lead to a change in the flight attitude. Only when the output signal $P_H$ of the control force pickup 10 reaches the minimum value $P_A$, in the case where $P_{Ae}=P_A$, does a control signal from the output of the summing element 13 reach the control input 4' of the trimming motor 4 which now compensates by an appropriate reaction further increasing disturbing forces that may occur.

It is possible, by adjusting the amplification factor $k=1/K_{Fe}$ of the operational amplifier 11, to provide the pilot with an individually selectable spring stiffness or spring constant of the spring 17 which deviates from the mechanical spring constant $K_f$. This feature will now be illustrated for the case in which the pilot initiates a control movement for an increase in the flight speed. After the mechanical minimum force $P_A$ of the spring 17 is exceeded, as described above, a change of the output signal corresponding to the now resulting spring displacement $d_F$, is supplied at the output of the displacement pickup 6. A signal also occurs at the output of the summing circuit 13, it is assumed that $P_{Ae}=P_A$, which is applied to the summing circuit 9 after being multiplied by the amplification factor k of the amplifier 11. If $K_{Fe}=K_F$, then the two signals coming from the displacement pickup 6 and from the control force pickup 10 mutually compensate each other in the summing circuit 9. If, however, an adjustment is made so that $K_{Fe}<K_F$, that is, the amplification factor k of the amplifier 11 is increased, then a resultant control signal for the trimming motor 4 occurs at the output of the summing element 9. The trimming motor 4 now controls the spring 17 so that it is relaxed somewhat, whereby a seemingly decreased spring stiffness or rather a decreased control-force gradient of the curve $P_H$ in relation to the control displacement $d_F$ results.

In the converse, when $K_{Fe}>K_f$, that is, for a decrease of the amplification factor k, an apparent increase in the spring stiffness of the spring 17 due to the corresponding reaction of the trimming motor 4 results. This signifies a change in the slope of the curve shown in FIG. 3a originating from a slope parallel to the abscissa for the case $K_{Fe}=0$ and with an increasing slope when $K_{Fe}$ increases, whereby all of these lines corresponding to the variable and adjustable parameter $K_{Fe}$ intersect the ordinate at the point $P_H=P_A$.

Although the invention has been described with reference to specific example embodiments, it will be appreciated, that it is intended to cover all modifications and equivalents within the scope of the appended claims.

What I claim is:

1. In an apparatus for automatically eliminating control-force errors arising in an aircraft, especially a helicopter, due to disturbing forces acting upon a control stick for adjusting elevator means or rotor blades, wherein a control linkage is articulated to said control stick for connecting the control stick to a main control drive, wherein a control rod is operatively connected with one end to said control stick approximately opposite said control linkage, the other end of said control rod being operatively arranged for cooperation with a spring box enclosing a pre-tensioned spring, and wherein a trimming motor is also operatively arranged for cooperation with said spring box through a trimming member, the improvement comprising displacement difference pickup means for measuring a difference between the control displacement of said control linkage (2) and the displacement of said trimming member (15) to provide a respective difference signal, control force pickup means (10) for measuring the pilot's hand force applied to the control stick (1) to provide a respective hand force output signal ($P_H$); signal limiter circuit means (12) connected to receive said output signal from said control force pickup means (10) to provide a respective output signal ($P_{H1}$), signal summing means (13) connected for subtracting said output signal ($P_{H1}$) of said signal limiter circuit means (12) from said output signal of said control force pickup means (10) to provide a further difference signal ($P_{H2}$), amplifier means (11) connected to receive said further difference signal from said signal summing means (13), to provide an amplified signal, further summing circuit means (9) connected to receive said first mentioned difference signal and said amplified signal to provide a trimming motor control signal, and means connecting said further summing circuit means to said trimming motor for controlling said trimming motor in response to said trimming motor control signal.

2. The apparatus of claim 1, wherein said displacement difference pickup means comprise a single displacement pickup (16) having two inputs and an output, one input being connected for sensing a displacement of said control rod (14) and thus of said control linkage, the other input being connected for sensing a displacement of said trimming member (15), said output of said pickup (16) providing said first mentioned difference signal for use in producing said trimming motor control signal.

3. The apparatus of claim 1, wherein said displacement difference pickup means comprise a first displacement pickup means (6) connected for measuring the displacement of said control rod (14) and thus of said control linkage for providing a first displacement signal, a second displacement pickup means (7) for measuring the displacement of said trimming member (15) for providing a second displacement signal, and first signal summing means connected to receive said first and second displacement signals for producing said first mentioned difference signal.

4. The apparatus of claim 1, wherein said control force pickup means (10) is a load cell for measuring said hand force output signal.

5. The apparatus of claim 1, wherein said control force pickup (10) comprises strain gage means for measuring said hand force output signal.

6. The apparatus of claim 1, wherein said amplifier means (11) is an operational amplifier having an amplification factor which is adjustable.

7. The apparatus of claim 1, wherein said signal limiter circuit means (12) has a signal limiting threshold value which is adjustable.

8. The apparatus of claim 3, further comprising a signal summing circuit (9') having one input connected to an output of said further summing circuit means (9) and to said second displacement pickup means (7) for subtracting an output signal of said second displacement pickup means (7) from said trimming motor control signal in a negative feedback circuit.

* * * * *